(12) United States Patent
Kakutani

(10) Patent No.: US 9,369,605 B2
(45) Date of Patent: Jun. 14, 2016

(54) IMAGE PROCESSING APPARATUS FOR OUTPUTTING INFORMATION EMBEDDED IN A CODE IMAGE ACCORDING TO VERSION INFORMATION INCLUDED IN THE CODE IMAGE

(75) Inventor: Naoya Kakutani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 13/571,103

(22) Filed: Aug. 9, 2012

(65) Prior Publication Data
US 2013/0051692 A1  Feb. 28, 2013

(30) Foreign Application Priority Data
Aug. 25, 2011 (JP) .................. 2011-184012

(51) Int. Cl.
*G06K 9/36* (2006.01)
*H04N 1/32* (2006.01)

(52) U.S. Cl.
CPC ...... *H04N 1/32133* (2013.01); *H04N 2201/323* (2013.01); *H04N 2201/3246* (2013.01); *H04N 2201/3269* (2013.01); *H04N 2201/3271* (2013.01)

(58) Field of Classification Search
CPC ..... H04N 19/00; H04N 7/50; H04N 7/26244; G06T 9/007
USPC .......................... 382/100, 232, 233, 239, 248; 375/240.12, 240.14, 240.16, 240.25; 380/200, 201, 210
See application file for complete search history.

(56) References Cited

U.S. PATENT DOCUMENTS

| | | | |
|---|---|---|---|
| 6,185,312 B1 * | 2/2001 | Nakamura et al. | 382/100 |
| 6,259,819 B1 * | 7/2001 | Andrew et al. | 382/248 |
| 6,681,029 B1 * | 1/2004 | Rhoads | 382/100 |
| 7,260,265 B2 * | 8/2007 | Prakash et al. | 382/239 |
| 2008/0074682 A1 | 3/2008 | Komatsubara | 358/1.1 |
| 2013/0051692 A1 * | 2/2013 | Kakutani | 382/233 |
| 2013/0236010 A1 * | 9/2013 | Schultz et al. | 380/200 |
| 2014/0016703 A1 * | 1/2014 | Denoual | 375/240.16 |
| 2014/0036300 A1 | 2/2014 | Takahashi | 358/1.14 |

FOREIGN PATENT DOCUMENTS

| | | |
|---|---|---|
| CN | 102045475 | 5/2011 |
| CN | 102103627 | 6/2011 |
| JP | 04-009963 | 1/1992 |
| JP | 2001-223880 A | 8/2001 |
| JP | 2005-348450 A | 12/2005 |
| JP | 2008-131522 | 6/2008 |

* cited by examiner

*Primary Examiner* — Amir Alavi
(74) *Attorney, Agent, or Firm* — Fitzpatrick, Cella, Harper & Scinto

(57) ABSTRACT

When embedded information having a data format version that is not supported by an image processing apparatus currently being employed is extracted, the image processing apparatus can not determine whether the embedded information should be output, even though the embedded information is available to be displayed. In a case wherein embedded information having a data format for a next generation, which is not supported by the image processing apparatus currently being employed, is extracted, output of the embedded information is halted to prevent the unintentional output of data.

11 Claims, 10 Drawing Sheets

FIG. 6A

Trace information Viewer — 601, 603, 604, 605

Result — 602    page 1/3    [◀prev] [next▶]

| name | Contents |
|---|---|
| format version | 01 |
| format revision | 01 |
| user name | john |
| print time | 11/12/2011 |
| job kind | copy |
| device serial number | ABCD12300 |

FIG. 6B

Trace information Viewer — 621, 623, 624, 625

Result — 622    page 1/3    [◀prev] [next▶]

THERE IS NO TRACE INFORMATION TO BE DISPLAYED

FIG. 6C

Trace information Viewer — 631, 633, 634, 635

Result — 632    page 1/3    [◀prev] [next▶]

| name | Contents | Preview 637 |
|---|---|---|
| format version | 01 | 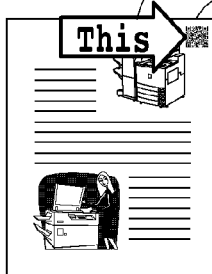 |
| format revision | 01 | |
| user name | john | |
| print time | 11/12/2011 | |
| job kind | copy | |
| device serial number | ABCD12300 | |

636

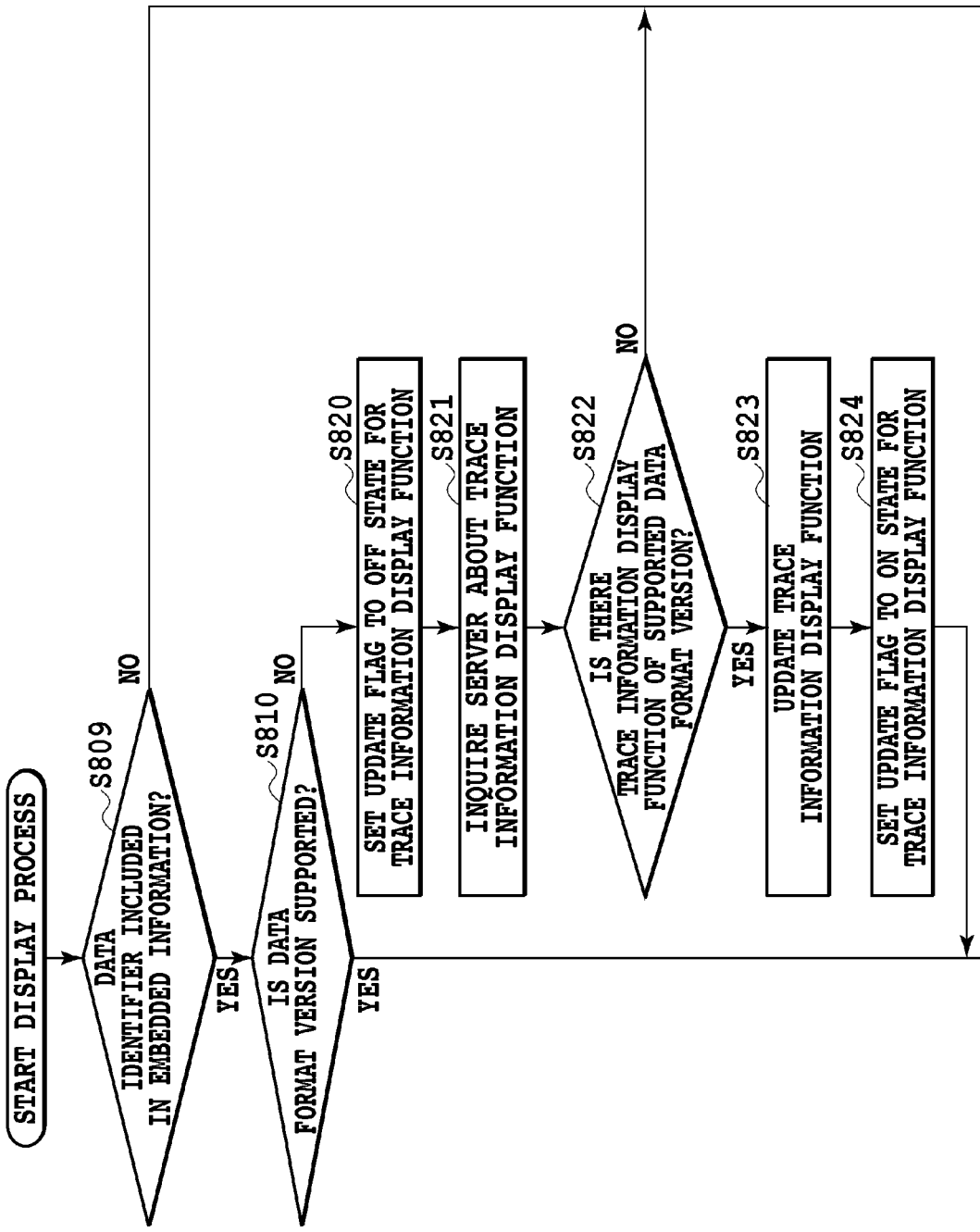

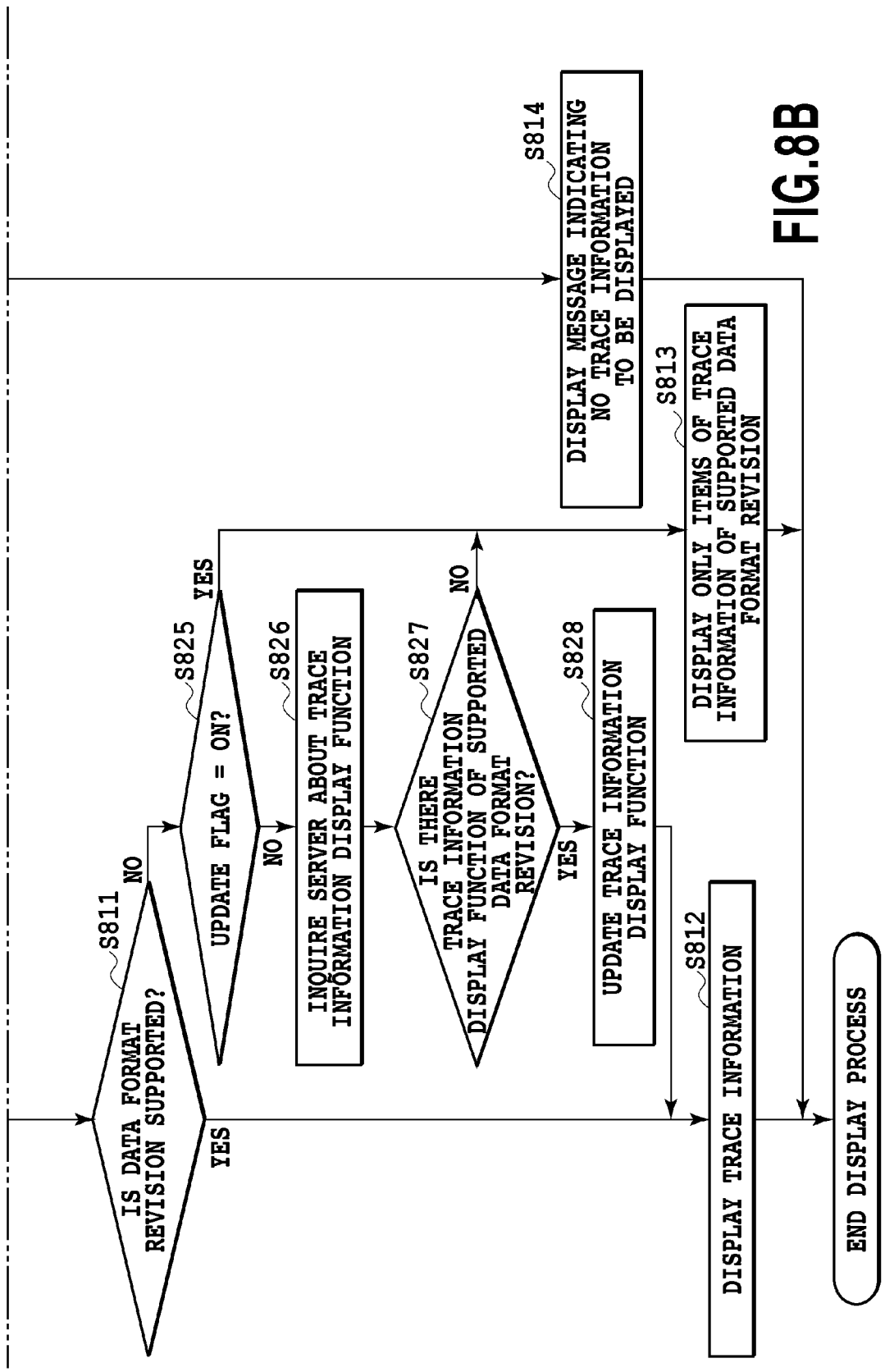

IMAGE PROCESSING APPARATUS FOR OUTPUTTING INFORMATION EMBEDDED IN A CODE IMAGE ACCORDING TO VERSION INFORMATION INCLUDED IN THE CODE IMAGE

BACKGROUND OF THE INVENTION

1. Field of the Invention

The present invention relates to an image processing apparatus and an image processing method whereby code images can be handled, and a program therefor, and relates more particularly to an image processing apparatus and an image processing method for controlling display of coded information, and a program therefor.

2. Description of the Related Art

When an original document is prepared by the printing of electronic data, it is difficult to perform the management of security for the original, and thus, the level of the security provided for the original is presently low.

Therefore, techniques for providing security measures for the original have been proposed that seek to identify a route, or routes, by which information may be leaked. As one of these proposed techniques for identifying an information leakage route, or routes, a code image (using two-dimensional code or a graphical image, such as an electronic watermark) is added to a medium, such as paper, and recording user information on the original.

User information in this case includes not only a user name, but also other information that identifies the creator of the original, such as a printing date and time and the serial number of a multifunction peripheral (MFP).

In Japanese Patent Laid-Open No. 2008-131522, a technique is disclosed whereby user information can be included in a two-dimensional code image of a provided size that can include a predetermined volume of information. In this case, two types of user information can be included.

Also for digital MFPs, there have recently been more cases involving the unauthorized release of the original, and a security measure technique is provided whereby an MFP performs printing while embedding user information in the above described two-dimensional code.

An example two-dimensional code to be embedded in a document is a QR Code (a registered trademark) disclosed in Japanese Patent Laid-Open No. H04-009963(1992). The QR Code is a two-dimensional code for general-purpose use. Therefore, the QR Code may be employed as a two-dimensional code, and be added to an original along with user information that is embedded in the QR Code. The MFP includes a function for displaying and outputting contents obtained by reading the two-dimensional code.

Further, in order to express the data list, the number of data sets and the data type for user information, a data identifier, a data format version and a data format revision may be jointly embedded in the two-dimensional code. Then, when the MFP reads the two-dimensional code, the MFP examines the data identifier, the data format version and the data format revision to determine whether the two-dimensional code is one that can be processed by the MFP, and provides control by either displaying or not displaying user information, or by selecting items to be displayed.

Here, the data format version and the data format revision included in the two-dimensional code will be described.

In the specification of the present invention, the terms "data format version" and "data format revision" are defined as information to be employed to manage or identify the list of data included as embedded information that is obtained by reading the two-dimensional code.

For performing a data conversion for the two-dimensional code (conversion into data consisting of a sequence of 0s and 1s), the version number (Version), which is information indicating the module size of two-dimensional code, an error correction level, binary data and information relative to a mode indicating a character code are generally employed. The "data format version" and the "data format revision" are provided separately from the information that is described above, and are employed to interpret information that has been embedded in two-dimensional code.

For a newly developed MFP that can support next-generation two-dimensional codes, for which the type and the volume of information to be embedded are changed, assume, for example, that a new function is added to the two-dimensional code function employed for a conventional MFP.

In this case, the data format version or/and the data format revision of the next-generation two-dimensional code are updated by incrementing the numerical value.

A difference between the data format version and the data format revision is that when the numerical value of the data format version is incremented, there is no guarantee that a currently employed MFP can interpret embedded information (recognition of embedded information), and then, only when the numerical value of the data format revision has been incremented, interpretation of embedded information can be performed by an MFP currently employed.

For example, in a case wherein a list of data for user information is changed, or wherein a new item for user information is defined, the numerical value of the data format version is incremented.

In a case wherein a change performed for the data format guarantees that interpretation can be performed for the items of user information already supported by the existing MFP, the numerical value of the data format revision is incremented. For example, in a case wherein a new user information item is added to the end of the user information conventionally designated, the information items located before the added item can be interpreted by the existing MFP. Therefore, such a change corresponds to incrementing of the numerical value of the data format revision.

A usage method assumed for the data format version and the data format revision will now be described. Data for the data format version and the data format revision are allocated at the same positions in the embedded information, regardless of the version or the revision. With this structure, even when the version or the revision differs, or the format for embedded information differs, the MFP can employ the embedded information to interpret the version information and the revision information.

The data format version is incremented when the format of the embedded information, consisting of two-dimensional code, is incompatible, and must therefore be changed. Thus, the data format version is changed in order to greatly alter the functional specifications provided by the two-dimensional code, so that the functional specifications differ from those for the existing MFP. For example, assume that the data list for user information included in the embedded information, which is defined in the data format version that precedes the latest change, represents a user name (32 bytes), a printing date and time (12 bytes) and a job type (4 bytes), in the named order. Further, assume that the data list for user information in the data format version of the next generation, which is incompatible, represents password information (20 bytes), a management ID (16 bytes), an email address (32 bytes) and a registration number (8 bytes), in the named order. In this case, since the list of data and the number of items are changed due to the change in the data format version, the existing MFP can decode the two-dimensional code, but can neither interpret nor identify the obtained data.

As for the data format revision, the numerical value is incremented in a case wherein format changing is performed to maintain the format compatibility of the embedded information of the two-dimensional code. This change is performed in order to extend or to change the specifications for the two-dimensional code while maintaining compatibility. For example, assume that the data list of user information, which is included in the embedded information defined in the data format revision that precedes the latest change, represents a user name (32 bytes), a printing date and time (12 bytes) and a job type (4 bytes), in the named order. Further, assume that for the compatible data format revision for the next generation, the name of a department is additionally provided at the last data position of the user information in the data format that precedes the latest change. In this case, the MFP currently being employed can interpret only the embedded information for the data format revision that precedes the latest one. Therefore, of the user information allocated by the latest data format revision, the existing MFP can interpret only the three items of user information allocated by the data format revision preceding the latest change. Thus, these information items can be handled in accordance with the specifications provided for the existing MFP.

SUMMARY OF THE INVENTION

According to the above described example, the existing MFP can obtain the embedded information in the data format version that is not supported by the existing MFP. For example, in a case wherein the two-dimensional code is expressed as binary data, the MFP can extract the binary data, and therefore, can display the binary data on a user interface screen, or can print the binary data in a report form. However, since the two-dimensional code is the binary data in the next-generation data format version that the existing MFP does not support, the existing MFP can not determine how to handle the binary data.

Specifically, in this case, since the MFP does not have information as to where in the binary data the user information is included, or information as to the data list of user information, the MFP can not determine how the user information should be displayed. Further, the MFP also can not determine whether displaying on the user interface screen or printing in a report form is permitted for the information included in the data, and whether the pertinent information is classified information that should not be disclosed.

For example, assume that there is two-dimensional code that includes user information in a data format version supported by the existing MFP and two-dimensional code that includes user information in a data format version that is not supported by the existing MFP. Also assume that password information and a management ID that are not disclosed to users are included in the two-dimensional code that the existing MFP does not support.

In a case wherein the two-dimensional code supported by the existing MFP is read, since the existing MFP has knowledge of the format of embedded information for this two-dimensional code, the existing MFP can display or output the embedded information using a format that has been designated in advance. For example, assume that three types of data consonant with the data format version are embedded in the two-dimensional code. In this case, since the existing MFP has knowledge of the list of the three types of data and the size of the data, the embedded data can be displayed or output, as designated.

In a case wherein the two-dimensional code in a data format version not supported by the existing MFP is read, the acquisition of embedded information is also available, because in this case, merely the data format version is not supported by the existing MFP, and extraction of the two-dimensional code can be performed by the existing MFP. The embedded information obtained at this time may be binary data, and when the embedded data, such as binary data, is available, the existing MFP can display or output the embedded information held by this two-dimensional code. However, since this embedded information is defined using a data format version that is not supported by the existing MFP, the existing MFP does not have information relative to the list of data, the data size and the items of data, and can not, therefore, interpret the embedded information. Therefore, the existing MFP can not determine how the obtained user information should be displayed or output. However, so long as simply the MFP is performing the operation for displaying or outputting the embedded information, the list of data that are not interpreted are displayed or output. At this time, when data, such as password information or a management ID, which should not be disclosed to general users, are included in the two-dimensional code, these data are also presented to general users.

An image processing apparatus according to the present invention, which reads from an original a code image in which version information is embedded that is used to define a version of a format for information that is embedded in the code image, and that indicates there is no guarantee of compatibility of the format of the version with a format of a version higher than the version, comprises:
an analysis unit configured to analyze information embedded in the code image; and
a control unit configured to control output of the embedded information obtained by the analysis unit in accordance with the version information obtained by the analysis unit,
wherein, when the image processing apparatus does not support the format of the thus obtained version information, the control unit does not output the embedded information.

According to the present invention, an image processing apparatus that can prevent the unintentional output of information embedded in a code image of a data format version that is not supported, and an image processing method and a program therefor can be provided.

Further features of the present invention will become apparent from the following description of exemplary embodiments (with reference to the attached drawings).

BRIEF DESCRIPTION OF THE DRAWINGS

FIG. 6A is a diagram showing an example trace information display screen, provided by a display unit, on which trace information is being displayed;

FIG. 6B is a diagram showing an example trace information display screen, provided by the display unit, on which no trace information is displayed;

FIG. 6C is a diagram showing an example trace information display screen, provided by the display unit, on which trace information is displayed and the position of two-dimensional code is indicated;

FIG. 8 is a diagram showing the relationship of FIGS. 8A and 8B; and

FIGS. 8A and 8B are flowcharts showing the processing performed by an MFP of a third embodiment of the present invention to control the determination and output of trace information.

DESCRIPTION OF THE EMBODIMENTS

Figure 1:
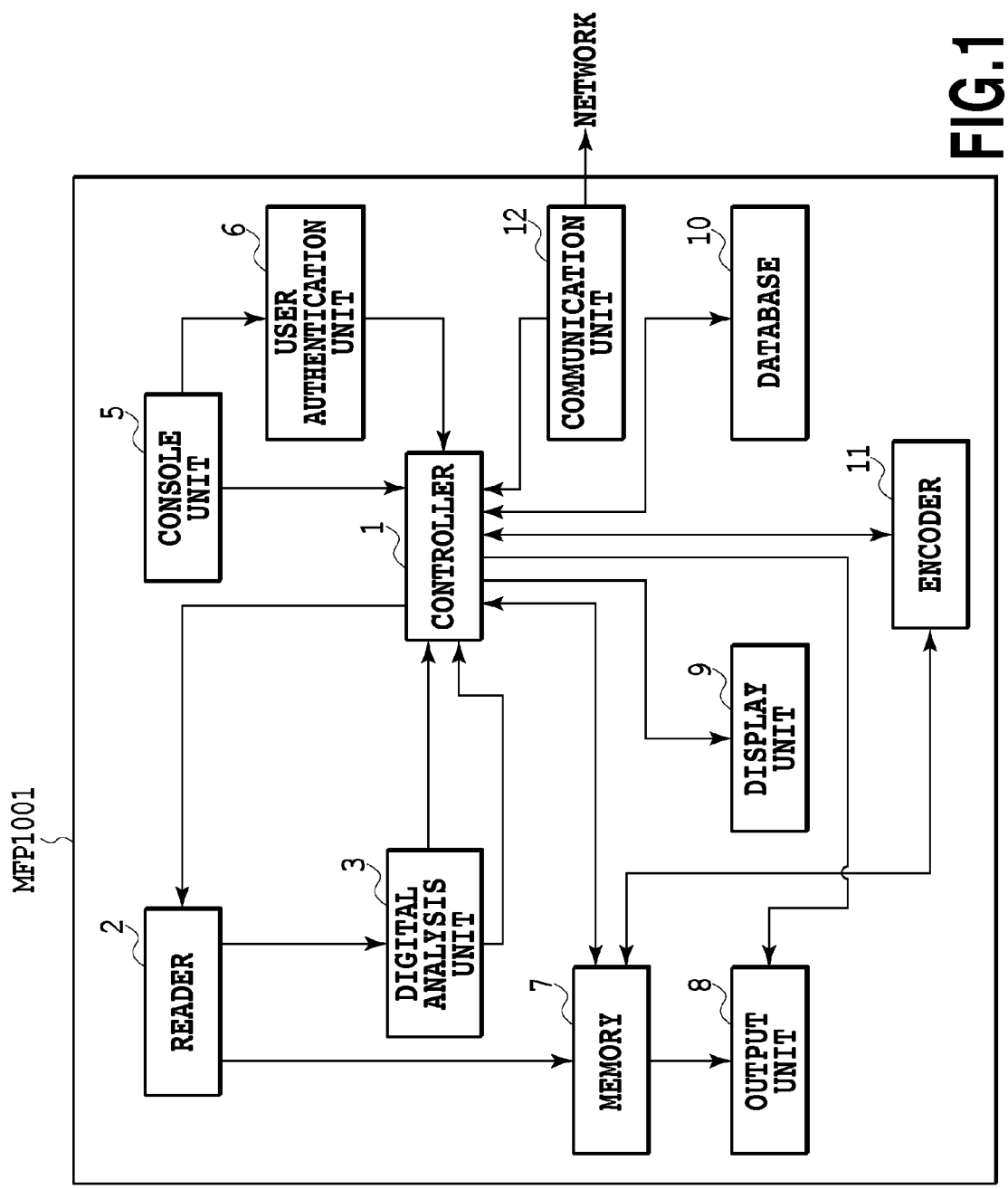
FIG. 1 is a block diagram of a multifunction peripheral (MFP) according to a first embodiment of the present invention.

The preferred embodiments of the present invention will now be described in detail based on the accompanying drawings. The components described in these embodiments are merely examples, and are not provided for the purpose to limiting the scope of the present invention to these embodiments.

First Embodiment

In a first embodiment of the present invention, a QR Code is employed as a code image included in a document to be scanned. However, a QR code is merely an example, and another two-dimensional code may be employed as a code image.

In this embodiment, "user information" is embedded in the code image of a predetermined size. The user information includes information to specify a user, such as a user ID, a user name, the email address of a user, contact address and telephone number of a user.

Next, the terms employed for this embodiment will be described.

In this embodiment, assume that a "data identifier", "user information", a "data format version" and a "data format revision" are embedded in a QR Code. Further, in this embodiment, the data identifier, the user information, the data format version and the data format revision are collectively called "trace information".

Furthermore, in this embodiment, a QR Code with the trace information being embedded is called a "trace information QR Code", and a QR Code without the trace information being embedded is called a "general information QR Code". In this embodiment, data included in the trace information QR Code are four types of data, i.e., a data identifier, user information, a data format version and a data format revision. However, information other than these data may also be included, and data included are not especially limited. Other information is, for example, information indicating copy protection or a document management ID.

The data identifier is information employed by an MFP to determine whether a QR Code is a "trace information QR Code" or a "general information QR Code".

In this embodiment, when a data identifier is included in the information embedded in a QR Code, this QR Code is regarded as a "trace information QR Code", or when a data identifier is not included, the QR Code is regarded as a "general information QR Code".

Therefore, since a data identifier is not embedded in the general information QR Code, a copier can not interpret the content of the information embedded in the general information QR Code.

The "data format version" is information indicating predetermined items and format of data embedded in a code image. As described above, in a case wherein the numerical value of the data format version is incremented (the number of a version is increased), interpretation of embedded information by the existing MFP is not guaranteed. The "data format revision" is also information indicating predetermined items and format for data embedded in a code image. In a case wherein the numerical value of the data format revision is incremented, interpretation for embedded information is enabled so long as items of data are those already coped with the existing MFP.

The processing for creating an original to which a trace information QR Code is added will now be described.

First, embedded data is obtained by encoding embedded information that includes a data identifier, user information, a data format version and a data format revision. Second, imaging for the embedded data is performed to generate a QR Code image. Third, the QR Code image and an image of the original are synthesized to generate a synthesized image of the original and the QR Code. Finally, a synthesized image of the original and the QR Code is printed.

Through this processing, the synthesized image is generated for the original and the symbol of a two-dimensional code (i.e., a "trace information QR code"), obtained by encoding the "data identifier", the "data format version", the "data format revision" and the "user information".

This process sequence is called "adding" of a data identifier, a data format version, a data format revision and user information, or "adding" of trace information.

It should be noted that the processing for encoding and imaging a data identifier, a data format version, a data format revision and user information (through this processing, QR Code is generated) is called two-dimensional coding of embedded information.

In this embodiments and the following embodiments, the above described operations for employing a QR Code, i.e., an operation for synthesizing a QR Code image with an image of the original and printing the synthesized image and an operation for reading the image of the original thus printed and controlling copy protection for the original, are employed as examples for explaining the individual process steps.

The processing for extracting embedded information from the image of the original to which a trace information QR Code is added will now be described.

First, an image for an original is generated by reading the original placed on a platen, or an automatic document feeder (ADF). Second, the image of the original is searched to find a QR Code image. Third, the QR Code image thus found is digitally analyzed to obtain embedded data. Fourth, the embedded data are decoded to obtain embedded information that includes a data identifier, a data format version, a data format revision and user information. Of this process sequences, the processing beginning with the second process is called "extraction" of information.

Further, in this embodiment, when a multifunction peripheral (MFP) 1001 obtains embedded information based on a trace information QR Code, the embedded information is stored as a log in the MFP 1001.

The configuration of the MFP 1001 for the first embodiment of the present invention will now be described in detail while referring to FIG. 1. FIG. 1 is a block diagram illustrating an example configuration for the MFP 1001 according to the first embodiment.

A controller 1 controls the operations of the individual units of the MFP 1001, and includes a central processing unit (CPU) (not shown).

The controller 1 also performs decoding of embedded data. The processing by the controller 1 is controlled based on a program stored in a memory 7. When the CPU of the controller 1 executes the program in the memory 7, not only the processes to be explained for this embodiment by using flowcharts in FIG. 2 and the other drawings, but also the processing that corresponds to an instruction entered at a console unit 5 is performed.

The console unit 5 is a unit configured to accept a manipulation made by a user on the MFP 1001.

A user authentication unit 6 is a unit configured to manage information required for authenticating a user that uses the MFP 1001. The operation of the user authentication unit 6 will be described later in detail.

A reader 2 is a unit configured to read (for example, scan) the above described original, and generate an image for the original. The original is a paper document, such as a printed matter, while the image of the original is digital (or analog) data.

A digital analysis unit 3 is a unit configured to detect a QR Code image in the image of the original and digitally analyze the QR Code image (convert the QR Code into data consisting of 0s and 1s).

The memory 7 is a unit configured to store the image of the original.

An output unit 8 is a unit configured to read the image of the original from the memory 7 and output the image of the original by printing, or by transmitting the image of the original to an external apparatus. An example external apparatus here is a PC connected to the MFP 1001 via a network.

A display unit 9 is a unit to be controlled by the controller 1 to display a screen.

A database 10 is a unit configured to store print settings and a usage log for the MFP 1001.

An encoder 11 is a unit configured to perform encoding and imaging for the embedded information described above.

A communication unit 12 is a unit employed by the MFP 1001 to perform network communication.

Next, the procedures performed by a user to add a trace information QR Code and the processing performed by the MFP 1001 in response to these procedures will now be described in detail.

First, a user who desires to add trace information to an original employs the console unit 5 to enter a user ID and a password, while watching a setup screen displayed by the display unit 9.

Information entered to the console unit 5 is transmitted from the console unit 5 to the user authentication unit 6. The user authentication unit 6 employs information that is managed, and determines whether the entered password is correct.

When it is determined that the entered password is correct, the user determination unit 6 transmits, to the controller 1, a notification that a correct password has been entered and a user ID.

When the controller 1 receives a notification indicating a correct password has been entered and a user ID, the controller 1 displays a checkbox to ask the user for adding or not adding copy control information (not shown here). When the user has checked the checkbox using the console unit 5, the controller 1 displays, on the display unit 9, a printing security setting dialog box 31 shown in FIG. 3.

The user employs the console unit 5 to check one of radio buttons 32 in the printing security setting dialog box 31, and selects one of choices "add trace information" and "do not add trace information". When "add trace information" is selected, trace information is to be added to the original to be printed.

Figure 3:
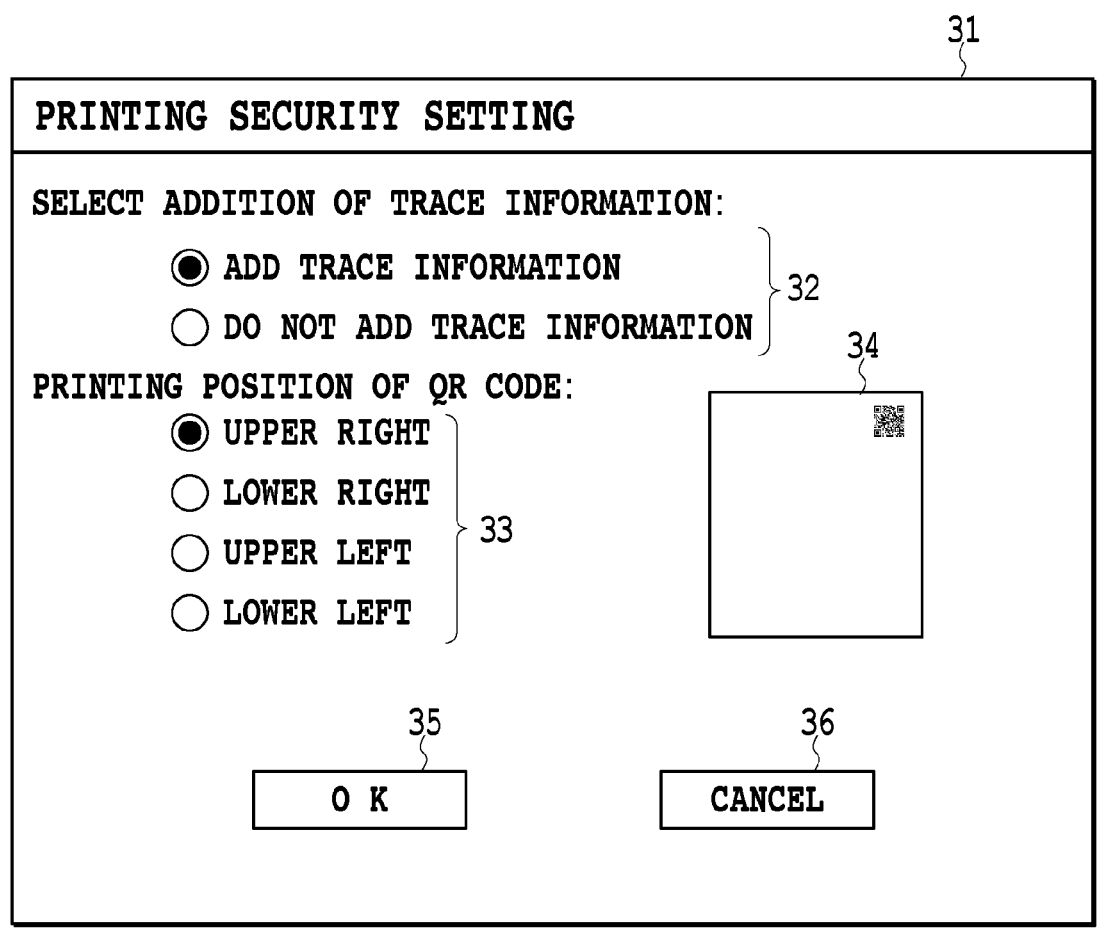
FIG. 3 is a diagram showing an example screen for printing security setting.

Further, when the user employs the console unit 5 to check one of radio buttons 33 in the printing security setting dialogue box 31, the position of a QR Code to be printed on the original can be designated. In this embodiment, one of the choices, "upper right", "lower right", "upper left" and "lower left" relative to the original is selected. Further, the selected printing position is displayed on a setting check screen 34 in the printing security setting dialog box 31, so that where the QR Code is to be printed on the original can be confirmed. FIG. 3 is a diagram showing an example wherein "upper right" is selected as the printing position of the QR Code.

It should be noted that the same trace information is added to all of the copies of the original that are produced through the process sequences of copying. The process sequences of copying indicate the processing in which the whole set of the original, placed on the platen or the ADF, is copied at one time upon receiving a copying instruction.

Therefore, in a case wherein the user placed a set of the original (e.g., consisting of four sheets) and has issued an instruction of three sets of copies to the MFP 1001, the process sequences of copying are performed to produce three sets of copies (i.e., 12 copies), to which the same trace information is added.

Further, a selection for adding or not adding the copy control information and the trace information may be performed by using the driver or the utility of a PC connected to the MFP 1001. Further, in the first embodiment of the present invention, only one set of trace information is added to one sheet of the original; however, the number of sets of trace information to be added is not limited to one set, and a plurality of sets of trace information may be added to one sheet of the original.

[Processing for Creating an Original]

The processing performed by the MFP 1001 for creating an original with which QR Code is included will now be described by referring to the flowchart in FIG. 2.

A program for performing this processing is stored in the memory 7 of the MFP 1001. The CPU of the MFP 1001 reads this program from the memory 7 and initiates the processing.

The controller 1 determines whether adding QR Code is designated for the printing security setting (S201).

When it is determined at step S201 that adding of QR Code is designated for the printing security setting, the controller 1 receives, from the console unit 5, the choice selected by a user on the printing security setting dialog box 31. The controller 1 transmits, to the encoder 11, information consonant with the choice (S202). As described above, when the selected choice is "add trace information", information instructing to add trace information is transmitted to the encoder 11.

Further, as a data identifier, a specified value determined in advance by the MFP 1001 is included in trace information, and as a data format version and a data format revision, information about a version and a revision supported by the MFP 1001 is also included in the trace information.

Sequentially, the reader 2 reads the original to generate an image for the original, and transmits the image to the memory 7 and the digital analysis unit 3 (S203).

Following this, the encoder 11 encodes and performs imaging for the trace information to generate a QR Code. Then, the encoder 11 transmits the obtained QR Code to the memory 7 (S204).

Thereafter, the controller 1 obtains printing position information for the QR Code designated in the printing security setting dialog box (S205).

When the controller 1 detects that the QR Code and the image of the original have been transmitted to the memory 7, the controller 1 synthesizes the QR Code with the image of the original, both stored in the memory 7, based on the printing position information for the QR Code, and generates an image of the original with the QR Code being added (S206).

In the above described example, it is assumed that when the original is copied, the code of user information is printed as a code image on the image of the original.

As a different configuration, there is also a case wherein print data is transmitted from a personal computer to an image forming apparatus to print a trace information QR Code on the original.

In this case, a printer driver transmits user information (information related to a user that uses a host computer) in addition to the print data. Upon receiving the print data, the CPU (not shown) of the image forming apparatus generates a code image data, while including user information in trace information. Further, the CPU synthesizes the thus generated code image data with print data to obtain image data, and permits the printing means (not shown) of the image forming apparatus to print the image data. Here, the coded user information that is included in code image data is information related to the creator of the original (the first person who prepared the original, or the person who issued an instruction to print the electronic data of the original).

The print data is also called document data. In this embodiment, the original is employed as an example, and code image data may not always be printed on the original, and may be printed on another medium, such as an OHP sheet. The original or a medium, such as an OHP sheet, that is employed to print image data on is called a medium in this embodiment. However, a storage medium differs from a medium described above, and indicates a device, such as a memory, an HDD, a CD or a DVD, on which digital information can be stored.

Figure 4:
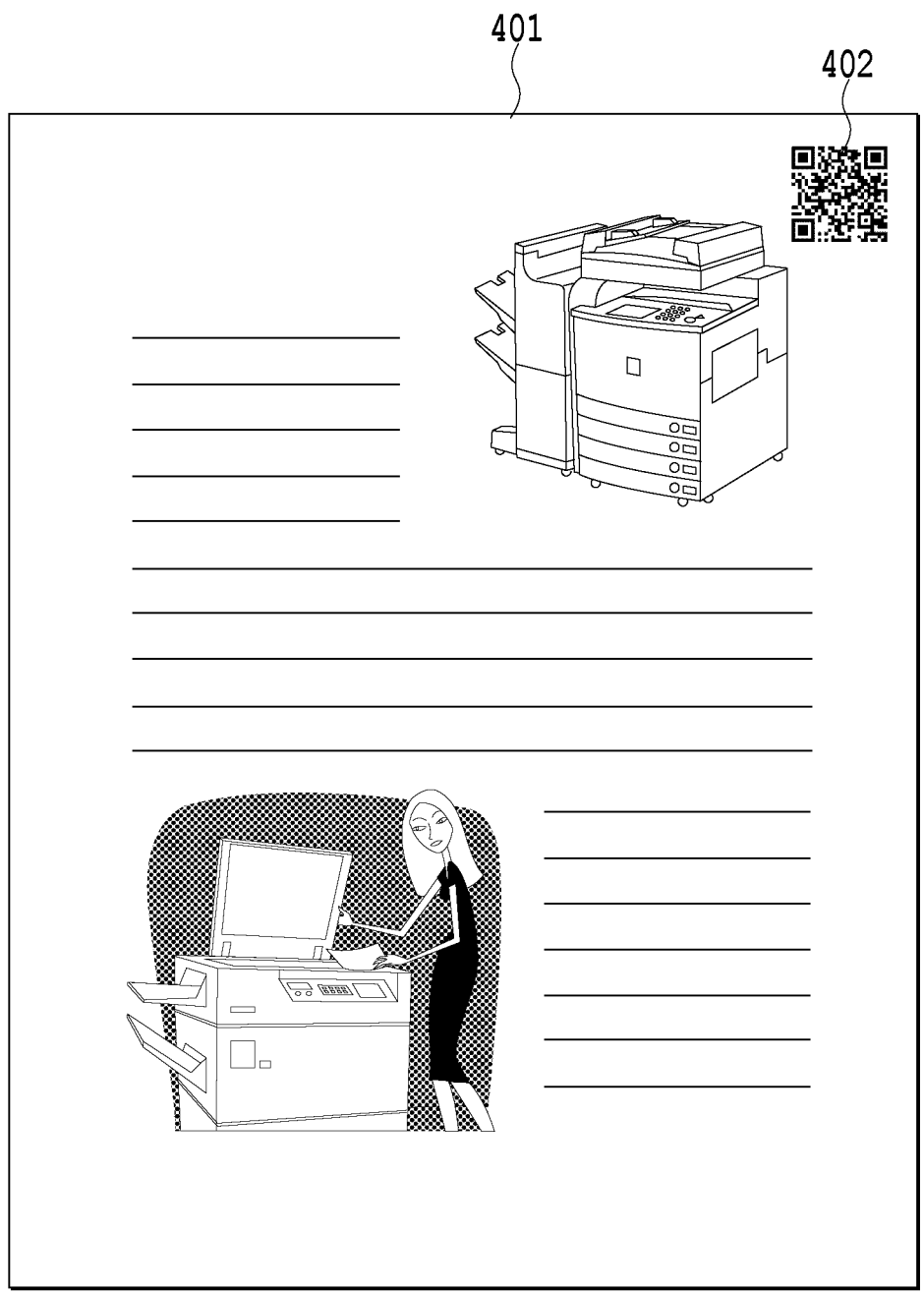
FIG. 4 is a diagram showing an example original to which a QR code is added.

FIG. 4 is a diagram showing an example synthesized image of an original and a QR Code. A QR Code 402 including copy control information is added to an original 401.

Figure 2:
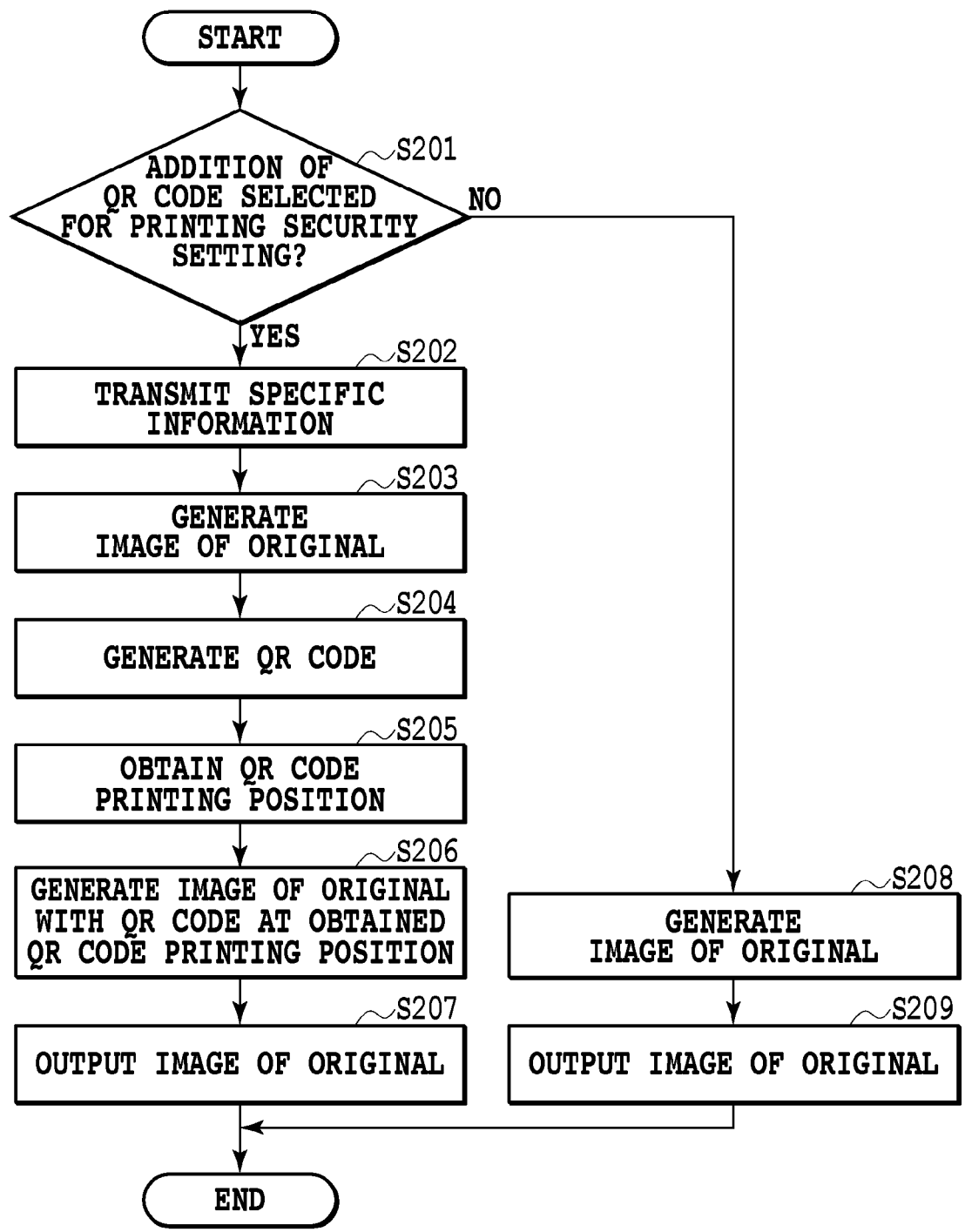
FIG. 2 is a flowchart showing the processing performed by the MFP to create an original to which a QR code is added.

Referring to FIG. 2, the controller 1 transmits, from the memory 7 to the output unit 8, the image of the original with the QR Code being added, and permits the output unit 8 to output the synthesized image of the original (S207). An example method for outputting the image of the original is printing of the image of the original.

When it is determined at step S201 that adding of a QR Code is not designated for the printing security setting, the reader 2 reads the original, generates the image of the original, and transmits the image to the memory 7 (S208).

When the controller 1 detects the image of the original has been transmitted to the memory 7, the controller 1 transmits the image of the original from the memory 7 to the output unit 8, and permits the output unit 8 to output the image of the original (S209).

Next, the processing for extracting copy control information from the image of the original will be described.

The digital analysis unit 3 detects position detection patterns (finder patterns) arranged at the three corners of a QR Code in the image of an original. When the finder patterns are present, the digital analysis unit 3 determines a QR Code is included in the image of the original. This process is called finding of a QR Code. The digital analysis unit 3 digitally analyzes this QR Code to obtain embedded data. Finally, the controller 1 decodes the embedded data included in the QR Code that has been found, and obtains trace information (embedded information). Through this decoding process, the controller 1 can obtain trace information. Since a QR Code employed in this embodiment is a general QR Code, no detailed description for the contents and steps of the decoding processing will not be given.

The above described processing for finding a QR Code in the image of an original, digitally analyzing the obtained QR Code to acquire embedded data, and decoding the embedded data to obtain trace information is called an "extraction" process. When the extraction process is performed, copy control information can be obtained from the image of the original.

[Process for Reading an Original]

The processing performed by the MFP 1001 for reading the original with a trace information QR Code being added, extracting trace information from the trace information QR Code, and displaying the results on the display unit 9 will now be described while referring to FIGS. 1 and 5.

This display processing is initiated when a user sets an original to the reader 2 of the MFP 1001 in order to confirm the contents of the trace information QR Code that is added to the original.

In the first embodiment, when each sheet is scanned, information embedded in one trace information QR Code can be displayed on the display unit 9.

Figure 5A:
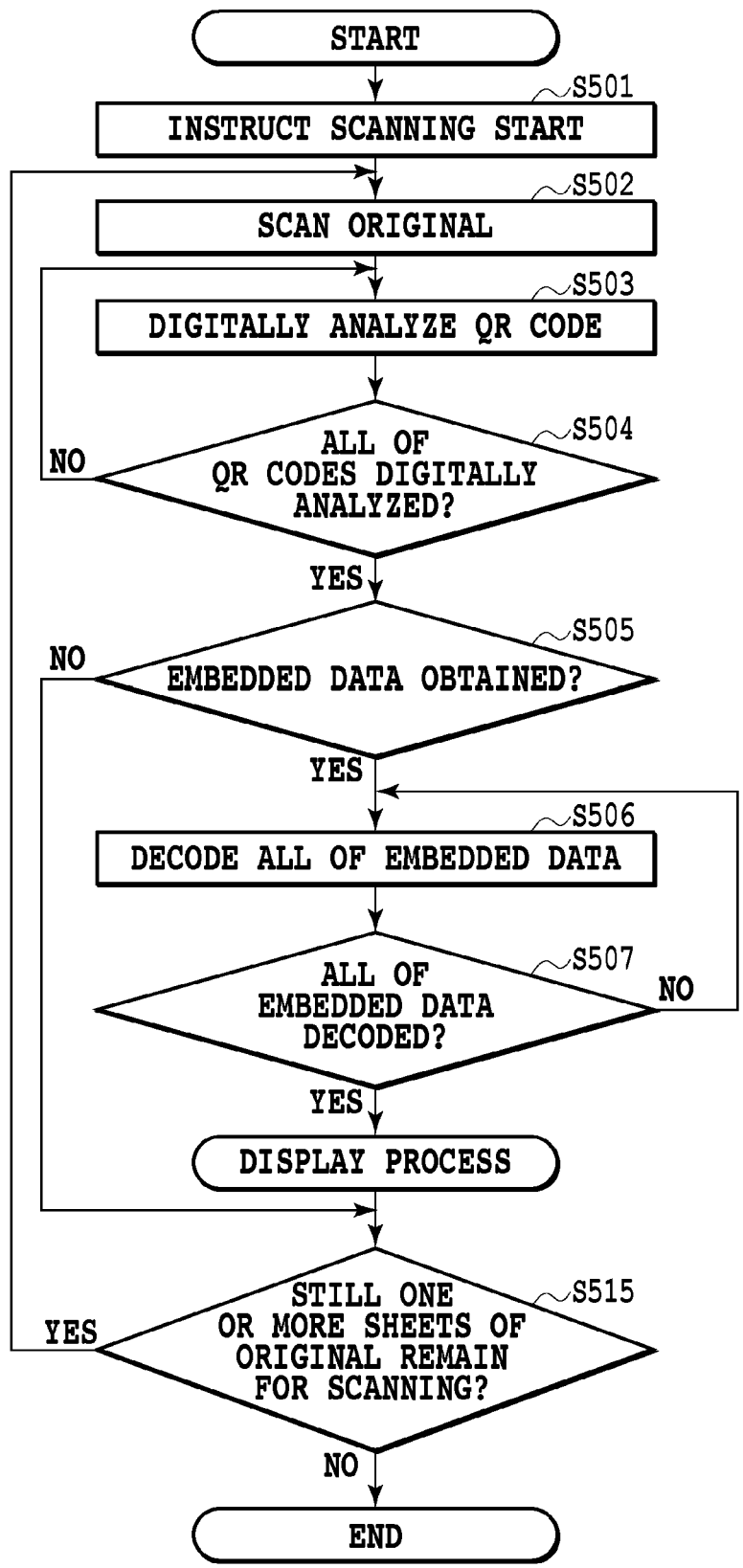
FIG. 5A is a flowchart showing the processing performed by the MFP of the first embodiment to control the reading of the original and the extraction of a two-dimensional code.
Figure 5B:
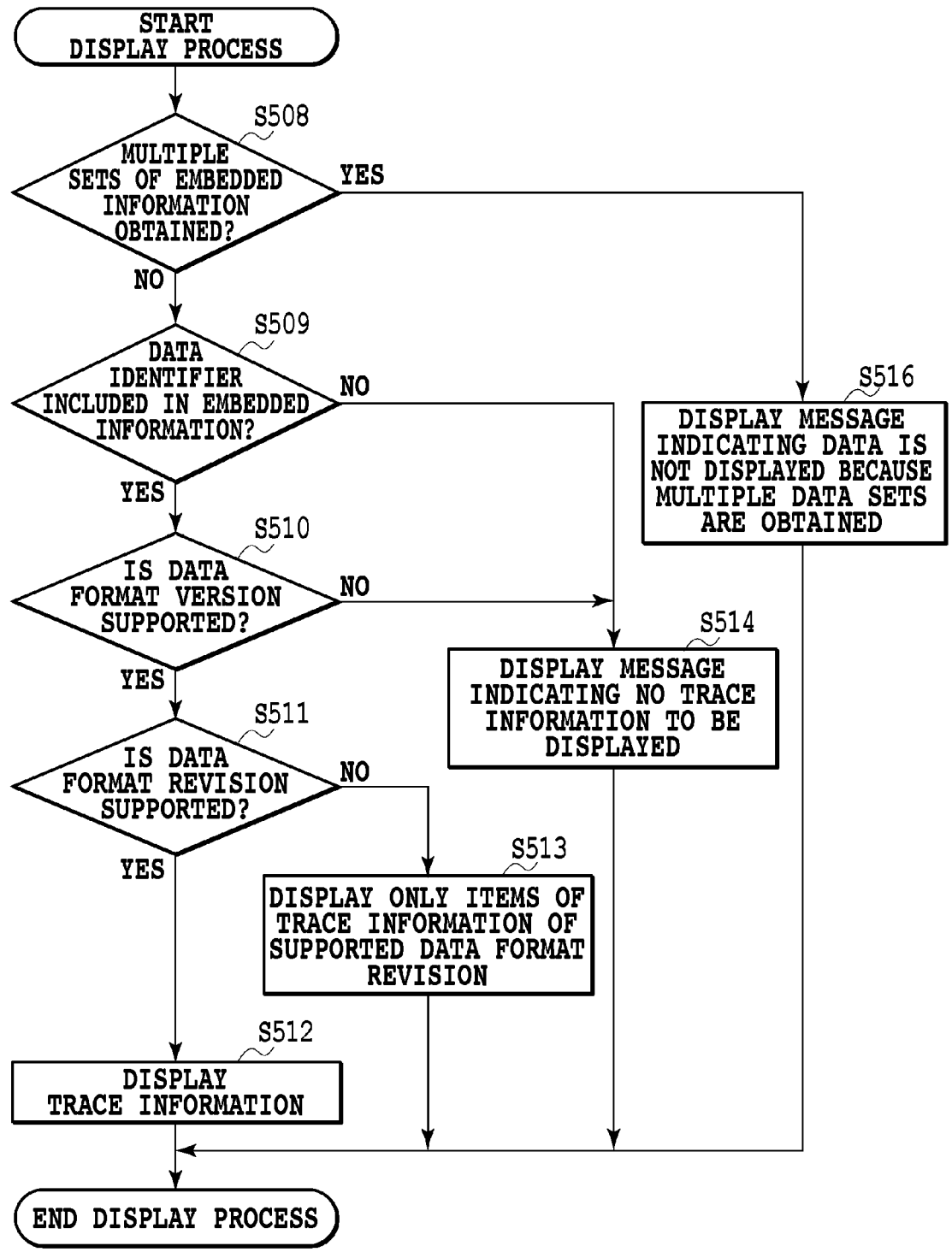
FIG. 5B is a flowchart showing the processing performed by the MFP of the first embodiment to control the determination and the output of trace information.

FIGS. 5A and 5B are flowcharts showing the operation performed by the MFP 1001 in this embodiment.

The flowchart in FIG. 5A shows the operation in which the MFP 1001 reads the original and extracts embedded information, and the flowchart in FIG. 5B shows the operation during which the controller 1 of the MFP 1001 interprets the embedded information, and displays trace information on the display unit 9.

A program for performing these processes is stored in the memory 7 of the MFP 1001. The CPU of the MFP 1001 reads the program from the memory 7, and executes these processes.

A user enters a reading start instruction via the console unit 5 (S501). The console unit 5 transmits an instruction to the controller 1 to start reading.

The controller 1 permits the reader 2 to read the original. The image of the original generated by reading the original is transmitted to the memory 7 and the digital analysis unit 3 (S502). When the image of the original is stored in the memory 7, the controller 1 begins to perform, for the image of the original, the image processing, such as halftone processing, required to be printed by the output unit 8.

The digital analysis unit 3 examines the image of the original to determine whether a QR Code is included, digitally analyzes the QR Code that is found, and obtains embedded data (S503).

Since the process at step S503 is repeated by N times (N is equivalent to the number of QR Codes; e.g., five times), the maximum N sets of embedded data might be obtained as the result at step S503.

Then, the controller 1 determines whether the digital analysis unit 3 has completed the digital analysis process for all of the QR Codes at step S503 (S504). When the QR Code digital analysis process is not yet completed, the program control returns to the process at step S503.

When it is determined at step S504 that the digital analysis unit 4 has completed the digital analysis process for all of the QR Codes, the controller 1 determines whether the digital analysis unit 3 has extracted embedded data from the image of the original through the QR Code digital analysis process (S505).

When it is determined at step S505 that the digital analysis unit 3 does not extract any embedded data from the image of the original, program control is shifted to step S515.

When it is determined at step S505 that the digital analysis unit 3 has extracted even one set of embedded data from the image of the original, the controller 1 decodes the obtained embedded data to acquire embedded information (S506).

The controller 1 determines whether there are still embedded data that are net yet decoded (S507). When it is determined that embedded data that are not yet decoded are present, program control returns to step S506.

When at step S507 the controller 1 has determined that decoding of all of the embedded data is completed, the controller 1 determines whether a plurality of sets of information are obtained as embedded information (S508).

When at S508 the controller 1 has determined that not a plurality of sets of information are obtained as embedded information, the controller 1 determines whether a data identifier is included in the embedded information (S509).

When at step S509 the controller 1 has determined that a data identifier is included in the embedded information, the controller 1 determines whether a data format version obtained from the embedded information is supported by the MFP 1001 (S510).

In this embodiment, it is assumed that a data format version supported by the MFP 1001 is compatible with a lower version (old version), and is incompatible with an upper version (new version). For example, in a case wherein Version 02 is the current data format version supported by the MFP 1001, the MFP 1001 can handle trace information of trace information QR Codes in Version 01 and Version 02, and interpret or display the trace information. However, the MFP 1001 can not cope with trace information for trace information QR Codes in a new data format version, such as Version 03, 04 or 05, and can not interpret or display the trace information.

That is, at step S510, the controller 1 compares data format version information (hereafter referred to as "specification version information"), which indicates the function of MFP 1001 for interpreting embedded information, with a data format version for the embedded information that is obtained. When the specification version is newer than, or the same as the data format version of the embedded information that is obtained, the controller 1 determines that the obtained data format version can be supported by the MFP 1001. When the specification version is older than the data format version of the embedded information, the controller 1 determines that the data format version obtained is not supported by the MFP 1001. The specification version information is stored in the storage unit of the MFP 1001.

When at step S510 the controller 1 determines that the data format version obtained from the embedded information is supported, the controller 1 determines whether the data format revision obtained from the embedded information is supported by the MFP 1001 (S511). In this embodiment, it is assumed that the data format revision is compatible with a lower revision and incompatible with an upper revision.

Specifically, at step S511, the controller 1 compares data format revision information (hereinafter referred to as "specification revision information"), which indicates the function of the MFP 1001 for interpreting embedded information, with the data format revision included in the embedded information. In a case wherein the specification version of the MFP 1001 matches the format version of the embedded information, and the specification revision of the MFP 1001 is lower than the format revision of the embedded information, it is determined that the data format revision obtained from the embedded information is not supported by the MFP 1001 (No at S511). When the specification version of the MFP 1001 matches the format version of the embedded information, and the specification revision of the MFP 1001 is the same as, or higher than the format revision of the embedded information, it is determined that the data format revision obtained from the embedded information is supported by the MFP 1001 (Yes at S511). Further, when the specification version of the MFP 1001 is higher than the format version of the embedded information, it is also determined that the data format revision is supported by the MFP 1001 (Yes at S511).

Assume that the specification version of the MFP 1001 matches the format version of the embedded information, and the revision for the MFP 1001 is Revision 02. At this time, when data format versions obtained from are Revision 01 and Revision 02, the controller 1 determines that the data format versions are supported by the MFP 1001. When the data format version obtained from the embedded information is a new version, such as Revision 03, 04 or 05, it is determined that the data format version is not supported by the MFP 1001.

In a case wherein the versions are the same and only the revisions differ, the format for the data items that are included in the format of a new revision and that are also included in the format of an old revision is identical to the format of the old revision.

When at step S511 the controller 1 determines that the data format revision obtained from the embedded information is supported by the MFP 1001, the controller 1 displays the trace information on the display unit 9 (S512). Thereafter, program control moves to step S515.

FIG. 6A is a diagram showing a screen displayed on the display unit 9 to present the items of trace information at step S512.

A user can confirm individual items 602 of the trace information in a trace information display window 601. In this embodiment, since the data identifier used for the trace information QR Code is a fixed value that is not disclosed for a user, the data identifier is also not displayed on the display unit 9. However, the data identifier may be displayed on the display unit 9.

A total number of pages that have been scanned and the currently displayed page number are displayed on a page number display 603. According to the example in FIG. 6A, the total number of pages is 3, and a currently displayed page number is 1. Further, when the user presses a previous page button 604 or a next page button 605, the page on the display can be changed.

When at step S511 the controller 1 determines that the data format revision obtained from the embedded information is not supported by the MFP 1001, the controller 1 displays, on the display unit 9, only the items of trace information of the data format revision that is supported (S513). Then, program control is shifted to step S515. In this case, the screen in FIG. 6A as provided at step S512 is also displayed on the display unit 9.

As described above, at step S513, only the items of trace information of the data format revision that is supported are output on the display. As a result, trace information that is embedded in a code image, and that is not intended to be output or displayed can be prevented from being output, and security management to protect release of information can be improved.

When at step S510 the controller 1 determines that the data format version obtained from the embedded information is not supported, the controller 1 can not determine whether or not the embedded information should be displayed, and therefore, instead of displaying the embedded information on the display unit 9, displays a message indicating there is no trace information to be displayed (S514). Program control thereafter moves to step S515.

FIG. 6B is a diagram showing an example screen on which a message that there is no embedded information to be displayed is displayed. This screen is displayed on the display unit 9 by the controller 1. In this embodiment, as an example message, "there is no trace information to be displayed" is displayed in the window 621. It should be noted that components 622 to 625 in FIG. 6B correspond to the components 602 to 605 in FIG. 6A.

Because of this processing, even if data is obtained by decoding the two-dimension code of the data format version of the next generation that is not supported by the MFP 1001, displaying or outputting of such data is halted. As a result, displaying or outputting of data that originally should not be displayed or output can be prevented. Therefore, the security management to protect release of information can be improved.

When at step S509 the controller 1 determines that a data identifier is not included in embedded information, a message that there is no trace information to be displayed is displayed on the display unit 9, and displaying of embedded information is not performed (S514). Thereafter, program control moves to step S515.

As described above, when a data identifier is not included in the embedded information, the embedded information is not output and displayed. As a result, outputting and displaying of information that is not intended to be displayed can be prevented, and the security level for protecting the release of information can be increased.

When at step S508 the controller 1 determines that a plurality of sets of information are obtained as embedded information, the controller 1 displays, on the display unit 9, a message that trace information is not to be displayed because a plurality of data sets are obtained, and the embedded information is not displayed (S516). Thereafter, program control is shifted to step S515.

The reason that trace information is not displayed at step S516 because a plurality of data sets are obtained is that, in the first embodiment, when each sheet is scanned, only one set of trace information of a trace information QR Code can be displayed on the display unit 9, and displaying of a plurality of sets of trace information is not performed. In a case wherein a plurality of sets of trace information are displayed, a user will have a difficulty to identify a trace information QR Code, for which the information is currently being displayed. Therefore, when a plurality of sets of trace information are obtained, the trace information is not displayed.

At step S515, the controller 1 determines whether one or more sheets of a document still remain to be scanned by the reader 2.

When at step S515 the controller 1 determines that there are still one or more sheets of a document to be scanned by the reader 2, program control returns to step S502.

When at step S515 the controller 1 determines that there are no more document sheets to be scanned by the reader 2, the processing is terminated.

An explanation has been given for the control processing performed in a case wherein the MFP 1001, which includes a function for extracting trace information from a trace information QR Code, and displaying the results on the display unit 9, has extracted embedded information from a trace information QR Code of a data format version that is not supported. Even when embedded information, for which a data format version is not supported, and for which outputting or displaying can not be determined, is obtained through this processing, unintentional displaying or outputting of embedded information can be prevented.

Second Embodiment

A second embodiment of the present invention will now be described.

In the first embodiment, when each sheet of the original is scanned by the reader 2, trace information for only one trace information QR Code is displayed.

However, there is a case wherein a plurality of QR Codes are added to the original. For example, when two original sheets to which a QR Code is added are placed on a platen and scanned at the same time, embedded information of the two QR Codes is extracted. When embedded information for at least one of the QR Codes is to be displayed on a display unit, a user can not identify which QR Code has been selected to display embedded information.

Further, in the first embodiment, embedded information is not displayed for a trace information QR Code of a data format version that is not supported, and a QR Code that does not include a data identifier (i.e., a general information QR Code).

Assume that a plurality of QR Codes are extracted from one original sheet, and include a trace information QR Code (or a general information QR Code) of a data format version that is not supported and a trace information QR Code of a data format version that is supported. In this case, when embedded information for the trace information QR Code of the supported data format version is displayed together with information indicating the position of the QR Code on the original, it is more useful for a user.

In the second embodiment, in a case wherein a trace information QR Code (or a general information QR Code) of a unsupported data format version and a trace information QR Code of a supported data format version are extracted at the same time, the control processing performed to display which embedded information will be described.

In the second embodiment of the present invention, the operation of an MFP 1001 will now be described while referring to FIGS. 1 and 7. In this embodiment, the configuration of an image forming apparatus, the processing for detecting code image data and the processing for extracting the name of a login user who performed copying and recording the user name as user information are the same as those in the first embodiment.

Figure 7:
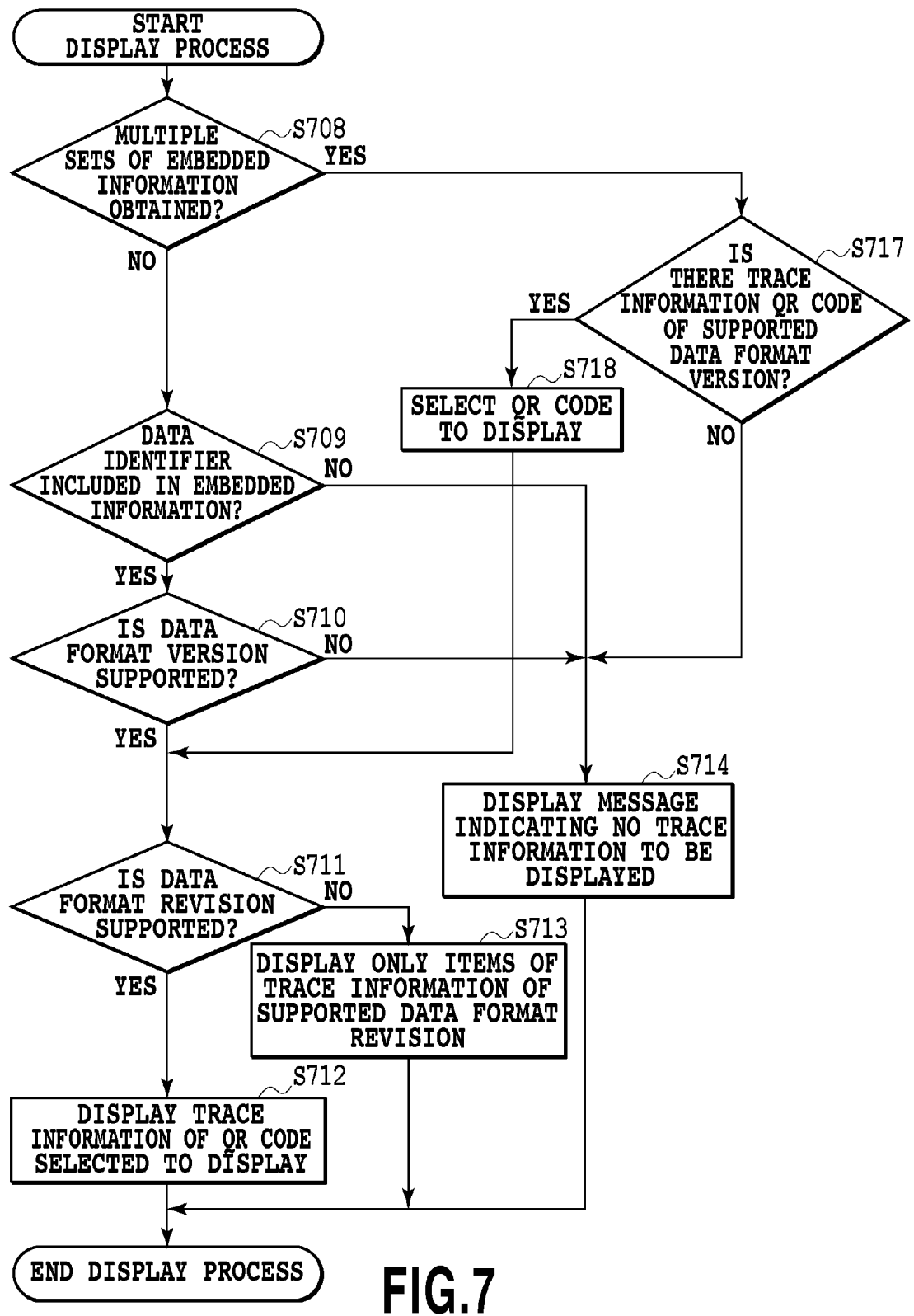
FIG. 7 is a flowchart showing the processing performed by an MFP of a second embodiment of the present invention to control the determination and the output of trace information.

Referring to the operation in the flowchart in FIG. 7, step S516 in the flowchart in FIG. 5 is removed, and steps S717 and S718 are additionally provided. Further, steps S512 and S513 are replaced with steps S712 and S713. The process for scanning an original and extracting embedded information is the same as that in FIG. 5A.

The processing different from that in the first embodiment will now be described.

When at step S708 a controller 1 determines that a plurality of sets of embedded information are obtained, the controller 1 determines whether the sets of embedded information include a trace information QR Code of a supported data format version (S717).

When at step S717 the controller 1 determines that the sets of embedded information do not include a trace information QR Code of a supported data format version, a message indicating there is no trace information to be displayed is displayed on a display unit 9, and displaying of the embedded information is not performed (S714). At this time, the controller 1 displays a window 621 in FIG. 6B on the display unit 9 to display a message indicating embedding information is not displayed. In a case at step S717 wherein the controller 1 determines that a trace information QR Code of a supported data format version is not present, all of the QR Codes are either trace information QR Codes or general information QR Codes of a data format version that is not supported.

When at step S717 the controller 1 determines that a trace information QR Code of a supported data format version is present, the trace information QR Code is set as a QR Code selected to be displayed (S718). Program control thereafter moves to step S711.

The definition for a QR Code selected to be displayed is a trace information QR Code to be displayed on the display unit 9 by the controller 1. When one original sheet that is scanned includes N QR Codes that are selectable to display on the display unit 9 of the MFP 1001, there are N choices for QR Codes to be displayed. In a case wherein, for each original sheet that is scanned, only one QR Code is available to be displayed, the controller 1 selects one of the N QR Codes to display. The selection condition employed by the controller 1 can be a QR Code having the oldest printing date and time for user information, a QR Code with specific information included in user information, the first extracted trace information QR Code, or a random selection, but the selection condition is not especially limited. When embedded information can be displayed for a plurality of QR Codes that were obtained by analyzing the image of one original, the embedded information of all the QR Codes may be displayed.

When at step S711 the controller 1 determines that the data format revision obtained from the embedded information is supported by the MFP 1001, the controller 1 displays trace information of the selected QR Code (S712). Thereafter, the displaying process is terminated.

FIG. 6C is a diagram showing an example screen to display the items of trace information of the QR Code that the controller 1 has selected to display on the display unit 9.

In this embodiment, not only the items of trace information of the selected QR Code, but also a preview screen 636, indicating the position of a QR Code on the image of the original, and a pointer 637 indicating the position of the selected QR Code are displayed on the display unit 9. It should be noted that components 632 to 635 in FIG. 6C correspond to those 602 to 605 in FIG. 6A. A method for indicating the position of the QR Code selected to display is not limited to a method using a pointer, but also an arbitrary method, such as a method for highlighting the position, can be employed so long as the position of the QR Code is indicated.

That is, at step S712, when a plurality of sets of trace information are embedded in a code image, not only the sets of trace information are displayed, but also the positions in the code image where the sets of trace information are embedded are displayed.

When at step S711 the controller 1 determines that the data format revision obtained from the embedded information is supported by the MFP 1001, the controller 1 displays, on the display unit 9, trace information of the selected QR Code (S712). Thereafter, the display process is terminated.

When at step S711 the controller 1 determines that the data format revision obtained from the embedded information is not supported by the MFP 1001, the controller 1 displays, on the display unit 9, only the items of trace information of the data format revision that is supported by the MFP 1001 (S713). The screen displayed on the display unit 9 in this case is the same as that in FIG. 6C provided at step S712. After the process at step S713 has been performed, the display process is terminated.

Through the processes at steps S717, S718 and S711 to S713, when a plurality of sets of information are embedded in a code image, only the set of the embedded information of a data format supported by the MFP 1001 (image processing apparatus) is output. More specifically, when a trace information QR Code, or a general information QR Code, of a data format version that is not supported and a trace information QR Code of a data format version that is supported are obtained at the same time, the trace information can be presented to the user to easily understand. Therefore, the user need not repeat scanning of the original, and the usability can be improved.

Third Embodiment

A third embodiment of the present invention will now be described.

According to the first and second embodiments, when the data format version of the trace information QR Code is not supported by the MFP 1001, the MFP 1001 can not determine whether the trace information should be displayed, and thus, does not display or output the trace information. Further, when the data format revision of the trace information QR Code is not supported by the MFP 1001, the MFP 1001 does not know a format for the items of trace information for the QR Code that is not supported, and thus, does not display the trace information.

In the third embodiment, the functional portion of a controller 1 of an MFP 1001 for determining and interpreting the contents of embedded information, and for displaying the embedded information on a display unit 9 is called a trace information display function. The trace information display function is stored in a memory 7, and is executed by the controller 1.

In this case, so long as the MFP 1001 can update the trace information display function, trace information of a data format version and a data format revision that are not supported can also be displayed.

In the third embodiment, an explanation will be given for the control processing in which, when trace information for a data format version or a data format revision that is not supported is extracted, the trace information display function is updated to display the trace information.

In the third embodiment of the present invention, the operation of the MFP 1001 will now be described while referring to FIGS. 1, 8A, and 8B. In this embodiment, the configuration of an image forming apparatus, the processing for detecting code image data and the processing for extracting the name of a login user who performed copying and recording the user name as user information are the same as those in the first and second embodiments.

Referring to the operation in the flowchart in FIGS. 8A and 8B, step S508 in the flowchart in FIG. 5 is removed, and steps S820 to S828 are additionally provided. The process for scanning an original and extracting embedded information is the same as that in FIG. 5A.

The processing different from that in the first embodiment will now be described.

At step S810, the controller 1 determines whether the data format version obtained from embedded information is supported by the MFP 1001. When it is determined that the data format version is supported, the controller 1 determines whether the data format revision obtained from the embedded information is supported by the trace information display function of the MFP 1001 (second decision) (S811).

When at step S810 the controller 1 determines that the data format version obtained from the embedded information is not supported by the MFP 1001, the controller 1 sets, to the OFF state, an update flag for the trace information display function that is stored in the memory 7 (S820). Then, program control advances to step S821. The update flag is a flag indicating whether the MFP 1001 has updated the trace information display function, and when the update flag is in the ON state, the trace information display function has already been updated. Further, at this time, when a plurality of sets of trace information included in a data identifier are added to the original, and when there is even one set of trace information for which the data format version is not supported, the process at step S820 is performed.

Following this, the controller 1 communicates with an external server via the communication unit 12, and inquires the server about the presence of a trace information display function (update program) of a data format version that is supported (step S821). This external server is an example storage area where the trace information display function (update program) is stored. The storage area for the trace information display function is not limited to this external server, and a storage device, such as an external database and a USB memory, or another MFP or PC may be employed. The controller 1 inquires the external device or the storage area, via the communication unit 12, about the presence of the trace information display function.

The controller 1 determines whether the trace information display function of a data format version that is supported is present in the server (first decision) (S822).

When at step S822 the controller 1 determines that the trace information display function is not present, a message indicating there is no trace information to display is displayed on the display unit 9, and displaying of embedded information is not performed (S814).

When at step S822 the controller 1 determines that the trace information display function for the supported data format version is present, the controller 1 permits the communication unit 12 to download, from the server, the trace information display function of the data format version that is supported, and stores the trace information display function in the memory 7. In this process, when a plurality of trace information display functions of the supported data format version are present in the server, the controller 1 selects and downloads one of the trace information display functions. The controller 1 may select and download a trace information display function of the latest data format version and the latest data format revision. Thereafter, the trace information display function of the MFP 1001 is updated (S823).

That is, at steps S821 to S823, in a case wherein the data format version of the trace information is not supported by the MFP 1001, a check is performed to determine whether, in order to support the data format, data employed to update the function of the MFP 1001 can be obtained from an external apparatus. When it is determined that such data can be acquired, the data is obtained from the external apparatus to update the function of the MFP 1001.

Sequentially, the controller 1 sets, to the ON state, the update flag for the trace information display function that is stored in the memory 7 (S824).

Then, the controller 1 determines whether the data format revision obtained from the embedded information (hereinafter referred to as an embedded information revision) is supported by the trace information display function of the MFP 1001 (S811).

More specifically, in a case wherein the version indicated in the data format version information obtained from the embedded information (hereinafter referred to as an embedded information version) is the same as, or older than the version indicated by the specification version information of the MFP 1001 (hereinafter referred to as an MFP specification version), it is determined that the data format revision is supported by the MFP 1001. Further, in a case wherein the embedded information version is the same as the MFP specification version, and the embedded information revision is the same as, or older than the revision indicated by the specification revision information of the MFP 1001 (hereinafter referred to as an MFP specification revision), it is determined that the data format revision is supported by the MFP 1001.

Further, in a case wherein the embedded information version is the same as the MFP specification version, and the embedded information revision is newer than the MFP specification revision, it is determined that the data format revision is not supported.

When at step S811 the controller 1 determines that the data format revision obtained from the embedded information is supported by the MFP 1001, the controller 1 displays the trace information on the display unit 9 (S812). Thereafter, the display process is terminated.

When at step S811 the controller 1 determines that the data format revision obtained from the embedded information is not supported by the MFP 1001, the controller 1 determines whether the update flag stored in the memory 7 is in the ON state (S825).

When at step S825 the controller determines that the update flag is in the ON state, it is assumed that the trace information display function of the data format revision supported by the MFP 1001 is not present in the server. Thus, the controller 1 displays, on the display unit 9, only the items of the trace information of the supported data format revision (S813). Thereafter, the display process is terminated.

When at step S825 the controller 1 determines that the update flag is not in the ON state, the controller 1 permits the communication unit 12 to communicate with the server and inquire the server about the presence of the trace information display function of the data format revision that is supported (S826).

Following this, the controller 1 determines whether the trace information display function of the data format revision that is supported is present in the server (S827).

When at step S827 the controller 1 determines that the trace information display function supported by the MFP 1001 is not present, the controller 1 displays, on the display unit 9, only the items of trace information of the data format revision that is supported (S813). Then, the display process is terminated.

When at step S827 the controller 1 determines that the trace information display function supported by the MFP 1001 is present, the controller 1 permits the communication unit 12 to download the trace information display function of the supported data format revision, and stores the trace information display function in the memory 7. At this time, the controller 1 may select and download the trace information display function of the latest data format revision. The trace information display function of the MFP 1001 is updated (S828).

The controller 1 thereafter displays the trace information on the display unit 9 (S812), and terminates the display process.

Therefore, when the trace information of a data format version and a data format revision that are not supported are extracted, the MFP 1001 updates the trace information display function by performing the above described processing, and can display the trace information.

As described above, according to the first to the third embodiments, when embedded information of the data format version for the next generation, which is not supported by the currently employed MFP, is obtained, unintentional displaying or outputting of data can be prevented. As a result, release of information can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-184012, filed Aug. 25, 2011, which is hereby incorporated by reference herein in its entirety.

What is claimed is:

1. An image processing apparatus including a processor comprising:
    a unit configured to decode a code image to obtain version information included in the code image, the version information being information defining a version of a format for information included in the code image; and
    a control unit configured to output information embedded in the code image if a version defined by specification version information for the image processing apparatus is newer than, or the same as a version defined by the obtained version information, and not to output the embedded information if the version defined by the specification version information is older than the version defined by the obtained version information, the specification version information being version information of the format related to a function of the image processing apparatus for interpreting the embedded information,
    wherein at least one of the unit and the control unit is implemented by the processor.

2. The image processing apparatus according to claim 1, wherein revision information is embedded in the code image to define a revision of a format for information embedded in the code image;
    wherein, if a version defined by the specification version information is the same as a version defined by the obtained version information, and a revision defined by specification revision information for the image processing apparatus is older than a revision defined by the revision information that is embedded, the control unit outputs, from among the embedded information, only items that have the same format; and
    wherein the specification revision information is revision information of the format related to the function of the image processing apparatus for interpreting the embedded information.

3. The image processing apparatus according to claim 2, wherein the revision information is information indicating that, when versions are the same and revisions differ between two formats, information items included in a format with a newer revision have the same format as a format with an older revision if the information items are also included in the format with the older revision.

4. The image processing apparatus according to claim 2, further comprising:
    a second determination unit configured to determine, when the specification version information is the same as the obtained version information and a revision defined by specification revision information for the image processing apparatus is older than a revision defined by the embedded revision information, whether data for updating the function of the image processing apparatus can be acquired from an external apparatus; and
    a unit configured to acquire the data from the external apparatus to update the function of the image processing apparatus if the second determination unit determines that the data can be acquired,
    wherein, if the second determination unit determines that the data can not be acquired, the control unit outputs, from among the embedded information, only items that have the same format.

5. The image processing apparatus according to claim 1, wherein if a plurality of sets of information are embedded in the code image, the control unit does not output the sets of information that are embedded.

6. The image processing apparatus according to claim 1, wherein if a plurality of sets of information are embedded in the code image, the control unit outputs only a set of embedded information having a format that is supported by the image processing apparatus.

7. The image processing apparatus according to claim 6, further comprising:
    a display unit configured to display, if a plurality of sets of information are embedded in the code image, a position on an original of the code image where the set of information to be output is embedded.

8. The image processing apparatus according to claim 1, further comprising:
    a first determination unit configured to determine, when a version defined by the obtained version information is not supported by the image processing apparatus, whether data for updating a function of the image processing apparatus can be acquired from an external apparatus; and
    a unit configured to acquire the data from the external apparatus to update the function of the image processing apparatus if the first determination unit determines that the data can be acquired,
    wherein, if the first determination unit determines that the data can not be acquired, the control unit does not output the embedded information.

9. An image processing method, performed by an image processing apparatus, comprising:
    decoding a code image to obtain version information included in the code image, the version information being information defining a version of a format for information included in the code image; and
    controlling output of information embedded in the code image such that the embedded information is output if a version defined by specification version information for the image processing apparatus is newer than, or the same as a version defined by the obtained version information, and the embedded information is not output if the version defined by the specification version information is older than the version defined by the obtained version information, the specification version information being version information of the format related to a function of the image processing apparatus for interpreting the embedded information.

10. A non-transitory computer-readable recording medium, on which is stored a program that makes a computer serve as an image processing, the image processing apparatus comprising:

a unit configured to decode a code image to obtain version information included in the code image, the version information being information defining a version of a format for information included in the code image; and a control unit configured to output information embedded in the code image if a version defined by specification version information for the image processing apparatus is newer than, or the same as a version defined by the obtained version information, and not to output the embedded information if the version defined by the specification version information is older than the version defined by the obtained version information, the specification version information being version information of the format related to a function of the image processing apparatus for interpreting the embedded information.

11. An image processing apparatus comprising:

a decoding unit configured to decode a code image to obtain version information included in the code image;

a control unit configured to output information embedded in the code image if a version defined by the obtained version information is supported by the image processing apparatus, or not to output the embedded information if the version defined by the obtained version information is not supported;

a determination unit configured to determine, when a version defined by the obtained version information is not supported by the image processing apparatus, whether data for updating a function of the image processing apparatus can be acquired from an external apparatus; and an acquisition unit configured to acquire the data from the external apparatus to update the function of the image processing apparatus if the determination unit determines that the data can be acquired, wherein, if the determination unit determines that the data can not be acquired, the control unit does not output the embedded information, and wherein at least one of the decoding unit, the control unit, the determination unit, the acquisition unit is implemented by the processor.

* * * * *